E. C. WHITE.
ELECTRICAL CONNECTING AND SUPPORTING DEVICE.
APPLICATION FILED JAN. 17, 1920.

1,361,426. Patented Dec. 7, 1920.

Inventor
Ernest Cantelo White
By Attorneys

UNITED STATES PATENT OFFICE.

ERNEST CANTELO WHITE, OF NEW YORK, N. Y., ASSIGNOR TO ELECTRIC OUTLET COMPANY, INC., OF NEW YORK, N. Y., A CORPORATION OF NEW YORK.

ELECTRICAL CONNECTING AND SUPPORTING DEVICE.

1,361,426.      Specification of Letters Patent.     Patented Dec. 7, 1920.

Application filed January 17, 1920. Serial No. 352,087.

*To all whom it may concern:*

Be it known that I, ERNEST CANTELO WHITE, a citizen of the United States, residing in the borough of the Bronx of the city of New York, in the State of New York, have invented certain new and useful Improvements in Electrical Connecting and Supporting Devices, of which the following is a specification, reference being had to the accompanying drawing, forming a part hereof.

In a copending application filed by the present applicant on January 10, 1920, Ser. No. 350,688, there is shown and claimed broadly an electrical connecting and supporting device for electrical appliances illustrating the novel principle on which the device is based. The underlying idea of the invention is to provide for universality in the connecting of electrical appliances to any available source of current supply and, simultaneously, supporting them in position. The particular principle involved in accomplishing this purpose is one in which couples or turning moments set up in the supporting devices are equalized by means which serve to hold such devices in fixed relation to a supporting member. In said copending case the invention was described with reference to an embodiment having special application to a lighting fixture for a ceiling, and in which the means for holding the various elements in fixed relation were of a mechanical character. The present invention will be described with reference to an embodiment of the same general principle in which an electric bracket is supported on a wall and in which gravity means are employed for maintaining the various elements in fixed relation. More particularly, the present invention has for its object to provide simple and compact elements, some of which are carried within the wall and some of which are carried by the bracket and which may be brought readily into coöperative relation for the purpose of establishing electrical connections between the bracket and the source of current supply and support the bracket in position when the latter, by simple manipulation, is applied to the elements carried within the wall. The illustrated embodiment is only one of many which will incorporate the same principle and accomplish the same result with the many advantages flowing therefrom, so it is to be understood as the description proceeds that many changes in form, dimensions and relation of parts, both as concerns their electrical and mechanical character, may be made without departing from the scope of the invention. In the illustrated embodiment it is proposed to mount within an outlet box a plate, block or the like having a bearing face curved rearwardly and upwardly with relation to a slot formed in the face plate, and to bring into operative relation to terminals within the outlet box and to said bearing faces correspondingly curved conductor arms which are operatively connected with the electrical bracket, both mechanically and electrically, and which will be held in fixed relation to said bearing surfaces by the turning moment impressed thereon by the weight of the bracket. The invention will be described in greater detail in the illustrated embodiment thereof shown in the drawing, in which—

The bracket which may be a light bracket or electrical fan or other appliance of any character is indicated at $a$, its usual canopy at $a'$ and an outlet box for receiving a flush receptacle or the like embedded within a wall is illustrated at $b$. The problem is to provide suitable electrical connecting and supporting devices by which the bracket $a$ may be attached to the outlet box $b$, the manipulation of the bracket serving to bring the elements in such relation as to establish electrical connection between the bracket and a source of current supply, and at the same time fix the bracket in supported position. In attaining this end there is illustrated within the outlet box $b$ an insulating block $c$ having a face plate $d$ and back plate $e$, the three blocks being secured together by means of through-bolts $f$. The receptacle thus formed may be supported fixedly in the outlet box $b$ by means of an angle piece $g$ secured by small bolts $g'$ to said receptacle and to the outlet box $b$ by means of suitable screws $g^2$. The face plate $d$ may lie flush with the wall in which the outlet box is embedded and may be of ornamental appearance harmonizing generally with the wall so that when no bracket is in position the sightliness of the wall remains substantially unimpaired. In the insulating block $c$ are formed chambers $c'$, $c^2$ in which are supported terminals $h$, $h'$ of any approved form and electrically connected with outlet wires $i$, $i'$ of any available source of current supply. The terminals $h$, $h'$ may be formed conveniently of opposed spring-leaf sections for a reason which will appear later.

Figure 1:
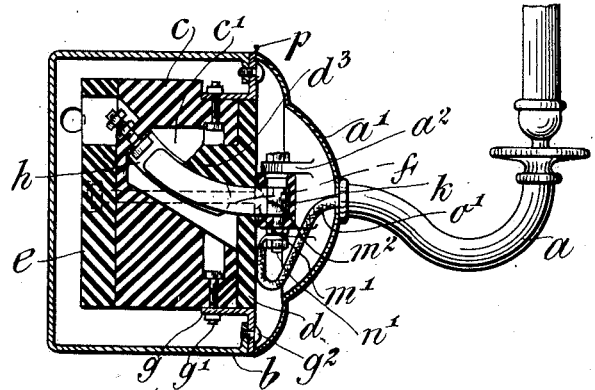
Figure 1 is a view in transverse section through an outlet box having an electric bracket attached thereto by means of the improved electrical connecting and supporting devices.
Figure 2:
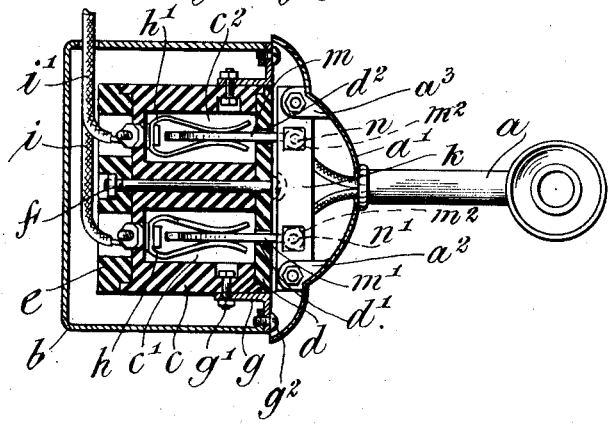
Fig. 2 is a view in horizontal section taken through the elements shown in Fig. 1.
Figure 3:
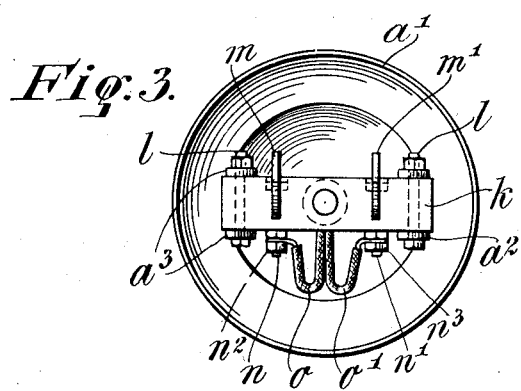
Fig. 3 is a view in elevation of the reverse face of the canopy showing the bracket removed from the flush receptacle.

On the rear wall of the canopy $a'$ are carried lugs $a^2$, $a^3$ between which may rest a block $k$ of insulating material adapted to be secured in place on the lugs by means of through bolts $l$. Extending into the block $k$ are curved conductor arms $m$, $m'$ which may be formed at their outer ends with eyes, one of which is indicated at $m^2$ in Fig. 1, for the purpose of receiving through-bolts $n$, $n'$, by means of which the arms $m$, $m'$, respectively are secured to the block $k$. The bolts $n$, $n'$ may serve as binding posts and have threaded on their lower ends binding nuts $n^2$, $n^3$, respectively, for attachment of the bracket wires $o$, $o'$, respectively. The elements, as thus far described, it will be evident, are susceptible of change in many different respects without departing from the spirit of the invention. For instance the manner of making up the insulating elements $c$, $d$, $e$ is entirely a matter of design, since corresponding parts may be formed as of less number or of greater number and arranged in different relationship to the electrical and mechanical elements necessary for an operative embodiment. Further, the particular means for supporting the conductor arms $m$, $m'$ on the bracket and electrically connecting them therewith may be greatly modified. For instance, there need be no positive connection between any of these elements since the parts may be so related that the bracket is adapted to be hooked on to the conductor arms or parts carried therewith.

The features incorporating the principle of the invention will now be pointed out. In the illustrated embodiment the insulating plate $d$ is provided with slots $d'$, $d^2$ in its face through which may pass the conductor arms $m'$, $m$, respectively. On the rear face of the plate $d$ and extending rearwardly from points adjacent the top edges of these slots $d'$, $d^2$ are bearing pieces, one of which, for the arm $m'$, is illustrated at $d^3$. This bearing piece may have its lower edge formed on the arc of a circle struck about a center indicated at $p$ which may lie in the plane of the face plate $d$ and on or outside of the upper edge of the canopy $a'$. The conductor arm $m'$ is curved on an arc struck about the same center. The terminal $h$ is so positioned as to be engaged electrically by the conductor arm $m'$ when the latter is forced home through the slot $d'$. While not illustrated in the drawing, it will be understood that the other conductor arm $m$ is formed on an arc struck about a corresponding center and has provided therefor a bearing piece corresponding to the bearing piece $d^3$ which extends rearwardly from the reverse face of the plate $d$ and may have its lower edge formed on an arc struck about the same center.

While the center of curvature $p$ has been located for the purposes of this application, the location described is not to be deemed in any sense a limitation on the scope of the invention since it is apparent that the location of this center with relation to the wall, the edge of the canopy, the slots, and the arms, is to be determined by the designer to effectuate the invention in the best manner according to the character of each installation.

The manner of applying the bracket $a$ to the outlet box $b$ whereby electrical connection between the bracket and the source of current supply is established and the bracket becomes supported in proper position on the wall will now be described. When the arms $m$, $m'$ are secured to the canopy $a'$, as in the illustrated embodiment, they will usually be in permanent electrical connection with the bracket as through the wires $o$, $o'$. When the bracket is to be applied the ends of the conductor arms $m$, $m'$ will be brought into registry with their respective slots $d^2$, $d'$ and forced inwardly through said slots. As the arms travel inwardly they will ride along the curved surfaces of the bearing pieces, one of which is indicated at $d^3$. It may be that the upper edge of the canopy $a'$ will engage the face of the wall or the face of the flush receptacle, but this engagement cannot prevent the continued inward movement of the conductor arms $e$, since the centers of the arcs about which they are struck will, as stated, fall on or outside of the upper edge of the canopy and in the plane of the wall. Accordingly, it may be that the final movement of the bracket will be about the upper edge thereof as a center, the lower edge being swung on the arc of a circle until it, too, is finally in engagement with the face of the wall. With the parts in this position, the upper edges of the curved conductor arms will engage at one point or some points the bearing pieces therefor, one of which is illustrated at $d^3$. It is to be understood, however, that it is within the scope of the invention to provide a bearing piece for the arms which need not be curved and which will be engaged by the arms at one point only. When the bearing pieces, such as $d^3$, however, are curved throughout their lengths it is obvious that the arms will have an extended bearing surface thereon. The turning moment of the bracket when in position is about the lower edge of the canopy as a center. This turning moment is equalized by the engagement of the arms $m$, $m'$ with their respective bearing pieces. The bracket, obviously, cannot be turned forwardly by reason of the curvature of the conductor arms. The greater the downward pressure imposed on the bracket by reason of its weight and otherwise, the greater becomes its locking moment. The bracket can only be withdrawn from its position by manipulating it in such manner as to swing its lower edge upwardly, thereby permitting the curved conductor arms to be withdrawn, moving about their own centers of curvature.

The principle of this particular embodiment of the invention hinges on the locking of the devices in fixed relation by gravity means, the action of gravity on the bracket being taken advantage of to effect such a locking. The principle is the same as that involved in the copending case above identified, except that such gravity locking means are employed instead of mechanical locking means.

It is believed that by the statements throughout the preamble and specification, it will be understood that features of design of the electrical devices and the mechanical means may be varied through wide ranges by one skilled in the art without departing from the principle set forth in breadth in said copending case and the subordinate principle stated herein as distinguishing the invention therefrom.

I claim as my invention:

1. An electrical connecting and supporting device including a wall receptacle formed with entrance openings and provided with terminals, and a plug member including fixture supporting means, two upwardly curved conducting and supporting members to engage the terminals, and insulating means between the fixture supporting means and said conducting members, said receptacle and terminals including bearing surfaces within the receptacle for the sides of the conducting and supporting members nearest to the plug member, said receptacle and plug member also including coöperating means for resisting the turning moments of the conducting and supporting members about their respective bearing surfaces by the weight of a fixture on the fixture supporting member.

2. An electrical connecting and supporting device including a wall receptacle formed with entrance openings and provided with terminals, and a plug member including fixture supporting means, two upwardly curved conducting and supporting members to engage the terminals, and insulating means between the fixture supporting means and said conducting members, said receptacle and terminals including bearing surfaces within the receptacle for the sides of the conducting and supporting members nearest to the plug member, said receptacle and plug member also including coöperating means for resisting the turning moments of the conducting and supporting members about their respective bearing surfaces by the weight of a fixture on the fixture supporting means, the curvature of said supporting members being such that the turning moment caused by the weight of the fixture thereon tends to maintain the said plug member in operating relation to the receptacle.

3. A wall receptacle for an electrical connecting and supporting device formed with entrance openings for two upwardly curved conducting and supporting members of a fixture supporting plug member of the device, and provided with terminals to be engaged by the conducting and supporting members, said receptacle and terminals including bearing surfaces within the receptacle for the sides of the conducting and supporting members nearest to the plug member, said bearing surfaces being in such relation to the respective conducting and supporting members that the turning moments caused by the weight of a fixture thereon maintain the said plug member in operating relation to the receptacle.

4. A plug member for a wall electrical connecting and supporting device including fixture supporting means, two upwardly curved conducting and supporting members to enter a wall receptacle of the device and engage the terminals therein, and insulating means between the fixture supporting means and said conducting members.

5. A plug member for a wall electrical connecting and supporting device including fixture supporting means, two upwardly curved conducting and supporting members to enter a wall receptacle of the device and engage terminals and bearing surfaces therein, the curvature of said supporting members being such that the turning moment caused by the weight of a fixture thereon tends to maintain the said plug member in operating relation to the receptacle, insulating means between the fixture supporting means and said conducting members, and means to limit the inward movement of said conducting members.

This specification signed this sixteenth day of January A. D. 1920.

ERNEST CANTELO WHITE.